Patented Feb. 18, 1930

1,747,403

UNITED STATES PATENT OFFICE

GEORGE S. TILLEY, OF MILL VALLEY, CALIFORNIA

PROCESS OF RECOVERY OF VANADIUM FROM COMPLEX SOLUTIONS

No Drawing.    Application filed June 3, 1927. Serial No. 196,401.

The present invention relates to the recovery of vanadium from materials containing iron and aluminum, and has for its object to recover all of the vanadium from such materials in a commercially useful form, such as ferro-vanadium.

Some varieties of alunite contain or carry associated therewith, more or less vanadium and iron.

This alunite can be treated in known manner for the production of alum, for example, by treatment with heat and leaching, and after the recovery of alum there remains a complex solution, principally sulfate, containing iron, aluminum and vanadium.

It will be understood that while the present invention is particularly described in connection with such liquors obtained from alunite, the same or similar liquors obtained in the treatment of other ore material can also be employed.

After having secured the solution of the three metals above referred to, existing principally as sulfates, unless the solution is already acid, I add a further quantity of acid, for example sulphuric acid. I then add a suitable oxidizing agent, which may be potassium nitrate or calcium hypochlorite, in order to oxidize all of the iron present into the trivalent condition, and to oxidize all of the vanadium present into the pentavalent condition.

It will be understood that this oxidation can be conducted in any suitable or well known manner, for instance by boiling the solution after the addition of the oxidizing agents above referred to or equivalent oxidizing materials. The solution is then brought to a specific gravity of not over 1.45, and preferably a specific gravity substantially less than this figure. In ordinary practise I find that a very satisfactory gravity for the solution is 1.25 to 1.30.

I then add an alkaline material or a material which is capable of neutralizing acid, for example calcium carbonate or milk of lime, to the oxidized solution, to neutralize a substantial part of the acid, and bring the hydrogen-ion concentration to approximately ten-thousandth normal.

Under these conditions, the iron is completely precipitated as basic ferric sulfate, and the vanadium is also precipitated, principally as vanadium pentoxide or basic salts of vanadium.

A small proportion of aluminum may also be precipitated therewith, the amount depending upon the care with which the operation of precipitation is controlled and performed. So far as the production of useful products containing vanadium is concerned, it is immaterial whether aluminum is also precipitated or not, at this stage.

The complex precipitate containing the iron and vanadium compounds, usually in admixture with a small amount of aluminum compounds, and usually containing the excess of calcium compound present, is then smelted in the usual way as in making iron from its ores, fluxes and reducing agents being employed as well known in the art, and the smelting operation being conducted in substantially the usual manner. There will then result an alloy of the iron and vanadium, or in other words ferro-vanadium, which may also contain a small amount of aluminum, this aluminum however not having any injurious effect upon the alloy for most purposes, so that the product is salable as ferro-vanadium for use in making vanadium steel or for any of the purposes for which vanadium alloys such as ferro-vanadium are ordinarily employed.

The complex precipitate of iron, vanadium and aluminum may also, and in many cases preferably be worked up by dissolution in as small a quantity as possible of dilute mineral acid, and precipitating vanadium therefrom as ammonium vanadate by methods known to the art. The residual mother liquor from this precipitation should however be returned to the cycle of operations, since ammonium vanadate is not highly insoluble and much would be lost if the mother liquor were discarded.

Having thus described my invention, I claim:

1. A process of recovering vanadium from acid liquors containing iron and vanadium in their highest state of oxidation, which comprises adding an acid neutralizing reagent in amount sufficient to bring the hydrogen-ion concentration to about ten-thousandth normal, separating the precipitate and smelting the same with a reducing agent.

2. A process of recovering vanadium from alunite leach liquors containing iron and vanadium, which comprises adding an acid-neutralizing reagent in amount sufficient to bring the hydrogen-ion concentration to about ten-thousandth normal, separating the precipitate and smelting the same with a reducing agent, and returning the said leach liquors to the new leach liquor about to be concentrated to crystallization of alum.

3. A process of recovering vanadium from acid liquors containing iron and vanadium, which comprises adding an acid-neutralizing reagent in amount sufficient to cause the precipitation of the bulk of the iron and vanadium, separating the precipitate and smelting the same with a reducing agent, and returning the acid liquor in a cycle to a step previous to the addition of acid-neutralizing reagent.

4. A process for recovering vanadium from alunite leach liquors containing iron and vanadium, which comprises adding an oxidizing agent which will form no soluble compounds in the solution, allowing the oxidation to proceed to equilibrium, precipitating iron and vanadium compounds by adding an acid neutralizing reagent and then returning the liquor to incoming liquor about to be concentrated for precipitation of alum.

In testimony whereof I affix my signature.

GEORGE S. TILLEY.